United States Patent
Morel

(10) Patent No.: US 7,279,813 B2
(45) Date of Patent: Oct. 9, 2007

(54) Z-θ TABLE ACTIVATED BY TWO ROTARY MOTORS

(75) Inventor: Jean-Pierre Morel, Les Fourgs (FR)

(73) Assignee: Etel S.A., Môtiers (CH)

( * ) Notice: Subject to any disclaimer, the term of this patent is extended or adjusted under 35 U.S.C. 154(b) by 0 days.

(21) Appl. No.: 11/490,714

(22) Filed: Jul. 20, 2006

(65) Prior Publication Data

US 2007/0046244 A1    Mar. 1, 2007

(30) Foreign Application Priority Data

Jul. 28, 2005    (CH)    .................................. 01261/05

(51) Int. Cl.
*H02K 41/20* (2006.01)

(52) U.S. Cl. ..................... 310/12; 13/14; 13/15; 13/20; 13/80; 13/89; 13/68

(58) Field of Classification Search ............ 310/12–15, 310/20, 80
See application file for complete search history.

(56) References Cited

U.S. PATENT DOCUMENTS

| 6,433,447 | B1 * | 8/2002 | Kitazawa et al. | ............. 310/12 |
| 6,570,282 | B1 * | 5/2003 | Ito et al. | ....................... 310/80 |
| 6,700,249 | B1 |  3/2004 | Botos |  |

* cited by examiner

*Primary Examiner*—Darren Schuberg
*Assistant Examiner*—Iraj A. Mohandesi
(74) *Attorney, Agent, or Firm*—Kenyon & Kenyon LLP

(57) ABSTRACT

A Z-θ table includes a bed capable of undergoing linear displacement along the Z-axis and angular positioning. The table includes two rotary motors arranged in a substantially concentric manner with two fixed stators. The interior rotor includes a device for guiding an intermediary piece along the Z-axis, and the exterior rotor includes a threaded portion that provides a nut associated with a threaded portion of an intermediary part arranged between the two rotors. The exterior rotor and the intermediary piece provide a ball-screw system. Each of the two rotors is associated with an angular displacement sensor for the precise determination of their angular positions.

6 Claims, 2 Drawing Sheets

Z-θ TABLE ACTIVATED BY TWO ROTARY MOTORS

CROSS-REFERENCE TO RELATED APPLICATIONS

The present application claims priority to Application No. 01261/05, filed in the Swiss Confederation on Jul. 28, 2005, which is expressly incorporated herein in its entirety by reference thereto.

FIELD OF THE INVENTION

The present invention relates to a Z-theta table, hereinafter referred to as a Z-θ table, which may be activated such that the table bed undergoes displacement along a linear Z axis and rotation, allowing angular, θ, positioning. The rotational movement and the linear displacement are obtained by two rotary electric motors.

BACKGROUND INFORMATION

A Z-θ table is described, for example, in U.S. Pat. No. 6,700,249, in which the Z-θ table includes two stacked circular motors, that is, arranged one above the other in the table's Z direction. The lower motor includes a fixed external stator and a central rotor occupying the interior space of the stator. The upper part of this central rotor is threaded. The upper motor also includes an external stator associated with a sliding device enabling this stator to undergo displacement along the vertical Z axis. This upper stator includes a base with an annular central part forming a nut associated with the threaded part of the rotor of the lower motor. Therefore, whenever the lower rotor is activated, the stator of the upper motor undergoes vertical displacement. The rotor of the upper motor is independent of the linear movement and allows angular positioning of the table. Linear movement is controlled by the single lower motor, whereas rotation is controlled only by the upper motor. To control both movements, the central lower rotor is associated with a circular encoder, while the upper motor stator is associated with a linear encoder mounted on the periphery of the table. Each of these two degrees of freedom, therefore, is associated with its own individual motor. In this sense, the two motors are independent, which represents a certain advantage in controlling the Z-θ table.

However, the table described in U.S. Pat. No. 6,700,249 is believed to present several drawbacks. Because of the arrangement of the two stacked motors, the table height is relatively significant. An angular offset of the central axis of the lower motor relative to the vertical axis engenders a positioning error that increases proportionally with the height of the table. The mass of the table is relatively high. Also, because the upper motor has a stator that undergoes vertical displacement, the power cable of this upper motor undergoes movement whenever the table is activated, which can be detrimental, particularly for clean-room applications. The ball-screw system between the two motors presents a relatively small diameter with respect to the dimensions of the table, which results in a limit to the load that can be carried by the table described above. This also reduces the stability of the table. Moreover, the load supported by the table is taken up by the fixed lower stator through two bearings or ball bearings, which is an impediment to the rigidity and stability of the table. In particular, there is a risk that a decentered load will tilt the Z-θ table base.

SUMMARY

Example embodiments of the present invention may provide a compact and reduced size Z-θ table that overcomes the drawbacks described above.

In an example embodiment of the present invention, a Z-θ table whose bed is displaceable along the Z axis and is angularly positionable, the table includes two appreciably concentric rotary motors, e.g., a first, internal, motor having a fixed central stator and a first rotor arranged on the exterior of this central stator, and a second, external, motor having a fixed peripheral stator and a second rotor arranged inside this peripheral stator. One of the two rotors includes a first cylindrical portion that is threaded and the other has a Z-axis linear guide device. The Z-θ table also includes an intermediate piece supporting the table bed and having a second cylindrical portion that is threaded and a sliding device associated with the guide device to provide displacement of the intermediary piece along the Z axis, the first and second cylindrical portions together forming a ball-screw system.

Due to the characteristics of the table, the behavior of this table may be particularly efficient. For example, the load carried by the bed is taken up by a single bearing or a ball bearing. The two stators are fixed and arranged on two sides of the rotary assembly formed by the two table rotors and the intermediary piece, which implies that the motor power cables remain fixed during activation of the Z-θ table. The two rotors act in complementary manner on the intermediate piece carrying the table bed to bring about either a linear displacement along the Z axis, or an angular displacement, or a helical movement.

Measurement of table position occurs by two angular encoders associated respectively with the two rotors, each of which has a circular scale. This may result in very high definition when measuring the exact position of each of the two rotors. Even if no vertical encoder for measuring the position of the bed on the Z-axis is provided, the precision of vertical positioning may be ensured by these angular encoders and the prestress exercised by the load on the threaded portion of the intermediate piece.

According to an example embodiment of the present invention, a Z-θ table includes: a bed linearly displaceable along a Z-axis and angularly positionable; two rotary motors arranged substantially concentric and providing an internal motor and an external motor, the internal motor including a fixed central stator and a first rotor arranged on an exterior of the central stator, the external motor having a fixed peripheral stator and a second rotor arranged within the peripheral stator, a first one of (a) the first rotor and (b) the second rotor including a first threaded cylindrical portion, a second one of (a) the first rotor and (b) the second rotor including a linear guide device along the Z-axis; and an intermediary piece supporting the bed and including a second threaded cylindrical portion and a slide device associated with the guide device to provide linear displacement of the intermediary piece along the Z-axis, the first cylindrical portion and the second cylindrical portions together forming a ball-screw system.

The first rotor and the second rotor may be mounted in rotary fashion on the central stator and on the peripheral stator, respectively, by first and second ball bearings, and the central stator and peripheral stator may be arranged interdependently.

The second rotor may include the first threaded cylindrical portion and the first rotor may include the linear guide device, and the linear guide device may be arranged within the second threaded cylindrical portion.

The first rotor and the second rotor may be respectively associated with a first angular displacement sensor and a second angular displacement sensor arranged on a base supporting the central stator and the peripheral stator.

The linear guide device may include columns, and the slide device may include holes traversing, along the Z-axis, a circular portion arranged within the second cylindrical portion of the intermediary piece.

According to an example embodiment of the present invention, a Z-θ table includes: a bed linearly displaceable along a Z-axis and angularly positionable; two rotary motors arranged substantially concentric and providing an internal motor and an external motor, the internal motor including a fixed central stator and a first rotor arranged on an exterior of the central stator, the external motor having a fixed peripheral stator and a second rotor arranged within the peripheral stator, a first one of (a) the first rotor and (b) the second rotor including a first threaded cylindrical portion, a second one of (a) the first rotor and (b) the second rotor including linear guide means along the Z-axis; and an intermediary piece supporting the bed and including a second threaded cylindrical portion and sliding means associated with the guide means to provide linear displacement of the intermediary piece along the Z-axis, the first cylindrical portion and the second cylindrical portions together forming a ball-screw system.

Example embodiments of the present invention are described in greater detail below with reference to the appended Figures.

DETAILED DESCRIPTION

Figure 1:
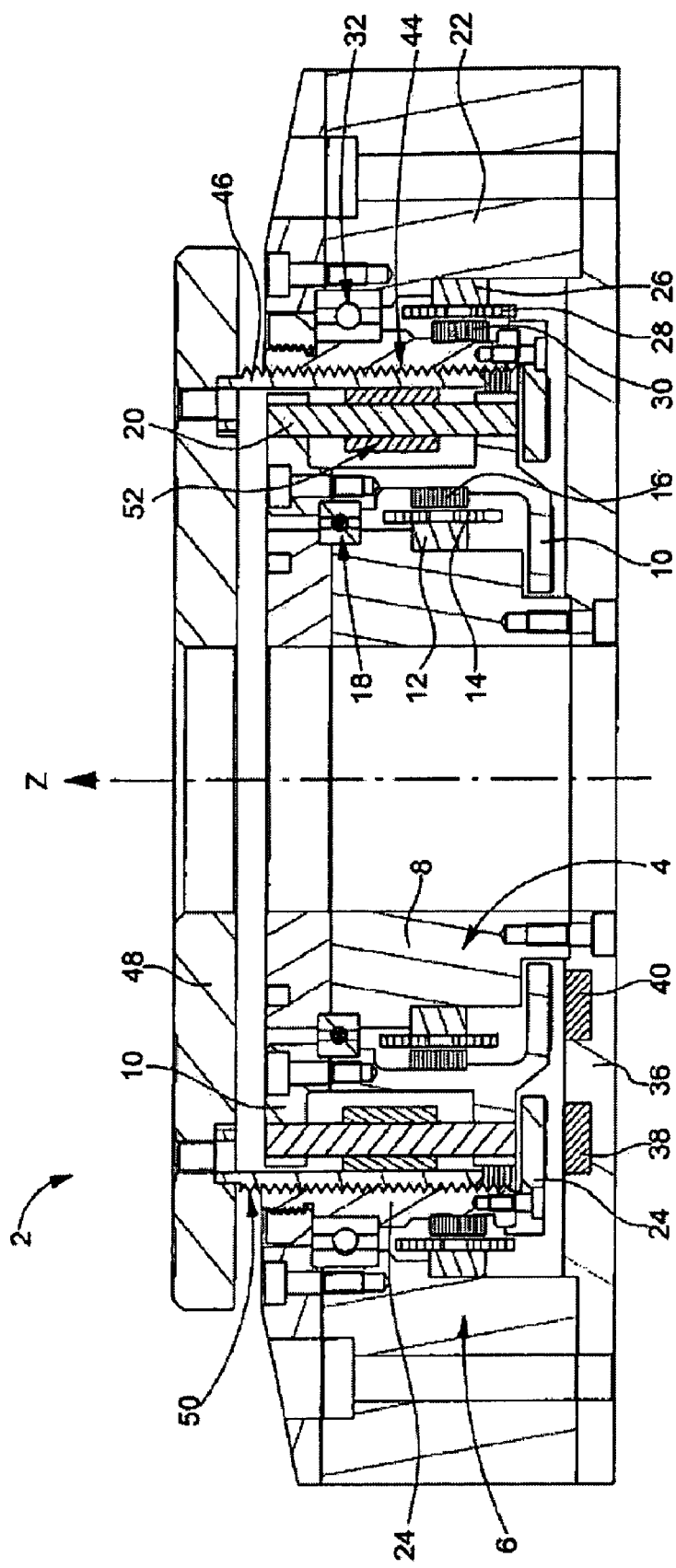
FIG. 1 is a cross-sectional view of a Z-θ table according to an example embodiment of the present invention.
Figure 2:
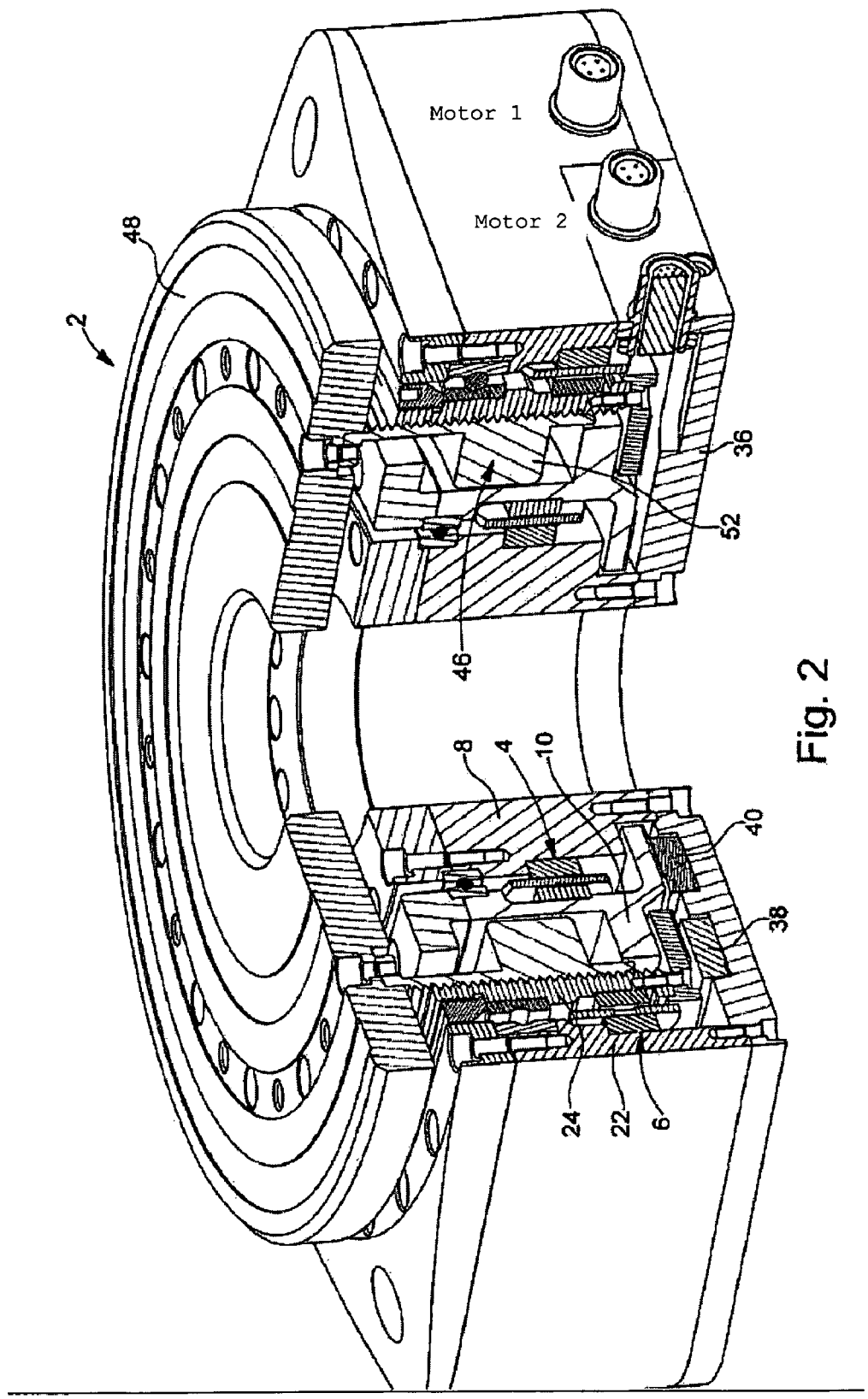
FIG. 2 is a perspective view, partially in cross-section, of the table illustrated in FIG. 1.

A Z-θ table according to an example embodiment of the present invention is illustrated in FIGS. 1 and 2.

Table 2 includes an internal motor 4 and an external motor 6, which are substantially concentric to one another. FIG. 1 is a cross-sectional view and is axially symmetric around the Z-axis, with the possible exception of the arrangement of the magnets and windings of the two motors 4 and 6.

Internal motor 4 includes fixed central stator 8 and rotor 10 arranged on the exterior of the central stator. Stator 8 includes lamination stack 12 bearing winding or coils 14. Rotor 10 carries magnets 16 opposite coils 14. Stator 8 and rotor 10 are associated with one another by first ball bearing 18. Rotor 10 has columns 20 arranged between two projecting parts oriented toward the exterior of rotor 10. These columns 20 provide the linear guide along the Z-axis, whose function will be described in greater detail below.

External motor 6 includes peripheral fixed stator 22 and rotor 24 arranged within this stator. Stator 22 also includes lamination stack 26 bearing winding 28. Rotor 24 has magnets 30, arranged opposite winding 28. Stator 22 and rotor 24 are associated with one another by a second ball bearing 32.

Stators 8 and 22 are connected together by base plate 36. The two stators and the base plate provide an internal housing for the two rotors 10 and 24. Each of the rotors presents a planar lower part with a circular scale arranged opposite a displacement measurement sensor, respectively 38, 40. These sensors may be of the optical type.

Rotor 24 includes an interior cylindrical portion with threaded portion 44 providing a nut of large diameter relative to the dimensions of the Z-θ table. Table 2 includes intermediate piece 46 supporting bed 48 of the Z-θ table. Intermediate piece 46 has a cylindrical portion presenting external threaded portion 50 and providing a threaded screw. Intermediate piece 46 includes a sliding device 52 associated with a guide device provided by columns 20 to provide displacement of this intermediate piece 46 along the vertical axis, Z. Threaded cylindrical portion 44 of rotor 24 and threaded cylindrical portion 50 of intermediate piece 46 together form a ball-screw system. Slide device 52 is formed by vertical holes machined in a circular portion arranged within the threaded cylindrical portion. Columns 20 are arranged in these vertical holes, and rotor 10 is arranged so that the internal circular portion of intermediate piece 46 may undergo a displacement along the vertical axis, Z, between the two external protruding parts of this rotor.

Sliding device and guide device may be arranged in different forms than illustrated. For example, the internal circular portion of the intermediary piece may be replaced by sleeves provided only at those places where columns 20 are arranged. The number of columns is, for example, equal to four or more, e.g., eight. The system with a column arranged in a hole crossing the Z-axis may be replaced by a system with a groove in which a slide moves. The grooves may, for example, be arranged on the periphery of rotor 10 and the respective slides arranged vertically on the internal surface of threaded cylindrical portion 50 of intermediary piece 46.

The load placed on bed 48 is transmitted to peripheral stator 22 and base 36 via a single ball bearing, e.g., ball bearing 32 of the external motor. This increases the rigidity and stability of the Z-θ table. Thus, ball bearing 18 may be smaller in size. The diameter of the ball-screw system provided for in the table hereof is large relative to the dimensions of the table, which increases the stability of the table and allows it to support relatively high loads. Since the two motors are substantially concentric, the height of the Z-θ table is not very high.

The ball-screw system may be provided between the rotor of the internal motor and the intermediary part, while the guide device may be arranged on the rotor of the external motor. In this arrangement, the intermediary part provides a nut, while the rotor of the internal motor provides the screw of the ball-screw system.

To displace bed 48 along vertical axis Z, it is sufficient to activate external motor 6. Bed 48 is maintained in its angular position by the rotor of the internal motor. To angularly position table 48 without effecting any linear displacements, the two rotors 10 and 24 are simultaneously made to rotate at the same angular velocity. Thus, the entire rotary assembly is made to rotate without intermediary piece 46 experiencing any linear displacement. Between linear displacement and pure rotation, an appropriate command may bring about any type of movement combining linear displacement with angular positioning. The two angular encoders 38 and 40 associated with the two rotors may be used to precisely control the position and movements of bed 48.

What is claimed is:

1. A Z-θ table, comprising:
   a bed linearly displaceable along a Z-axis and angularly positionable;
   two rotary motors arranged substantially concentric and providing an internal motor and an external motor, the internal motor including a fixed central stator and a first rotor arranged on an exterior of the central stator, the external motor having a fixed peripheral stator and a second rotor arranged within the peripheral stator, a first one of (a) the first rotor and (b) the second rotor including a first threaded cylindrical portion, a second one of (a) the first rotor and (b) the second rotor including a linear guide device along the Z-axis; and an intermediary piece supporting the bed and including a second threaded cylindrical portion and a slide device associated with the guide device to provide linear displacement of the intermediary piece along the Z-axis, the first cylindrical portion and the second cylindrical portions together forming a ball-screw system.

2. The Z-θ table according to claim 1, wherein the first rotor and the second rotor are mounted in rotary fashion on the central stator and on the peripheral stator, respectively, by first and second ball bearings, the central stator and peripheral stator arranged interdependently.

3. The Z-θ table according to claim 1, wherein the second rotor includes the first threaded cylindrical portion and the first rotor includes the linear guide device, the linear guide device arranged within the second threaded cylindrical portion.

4. The Z-θ table according to claim 1, wherein the first rotor and the second rotor are respectively associated with a first angular displacement sensor and a second angular displacement sensor arranged on a base supporting the central stator and the peripheral stator.

5. The Z-θ table according to claim 1, wherein the linear guide device includes columns, the slide device including holes traversing, along the Z-axis, a circular portion arranged within the second cylindrical portion of the intermediary piece.

6. A Z-θ table, comprising:

a bed linearly displaceable along a Z-axis and angularly positionable;

two rotary motors arranged substantially concentric and providing an internal motor and an external motor, the internal motor including a fixed central stator and a first rotor arranged on an exterior of the central stator, the external motor having a fixed peripheral stator and a second rotor arranged within the peripheral stator, a first one of (a) the first rotor and (b) the second rotor including a first threaded cylindrical portion, a second one of (a) the first rotor and (b) the second rotor including linear guide means along the Z-axis;

an intermediary piece supporting the bed and including a second threaded cylindrical portion and sliding means associated with the guide means to provide linear displacement of the intermediary piece along the Z-axis, the first cylindrical portion and the second cylindrical portions together forming a ball-screw system.

* * * * *